(12) United States Patent
Taniuchi et al.

(10) Patent No.: US 11,804,618 B2
(45) Date of Patent: Oct. 31, 2023

(54) SOLID-STATE BATTERY

(71) Applicant: HONDA MOTOR CO., LTD., Tokyo (JP)

(72) Inventors: Takuya Taniuchi, Saitama (JP); Masahiro Ohta, Saitama (JP); Toshiyuki Ariga, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 2 days.

(21) Appl. No.: 17/457,899

(22) Filed: Dec. 6, 2021

(65) Prior Publication Data

US 2022/0181678 A1 Jun. 9, 2022

(30) Foreign Application Priority Data

Dec. 8, 2020 (JP) .................................. 2020-203392

(51) Int. Cl.
*H01M 10/0562* (2010.01)
*H01M 10/0585* (2010.01)
(Continued)

(52) U.S. Cl.
CPC ....... *H01M 10/0562* (2013.01); *H01M 4/624* (2013.01); *H01M 4/661* (2013.01); *H01M 4/762* (2013.01); *H01M 10/0585* (2013.01)

(58) Field of Classification Search
CPC .... H01M 10/0562; H01M 4/62; H01M 4/661; H01M 4/762; H01M 10/0585; H01M 4/664

See application file for complete search history.

(56) References Cited

U.S. PATENT DOCUMENTS 8,951,661 B2 * 2/2015 Lev ..................... H01M 50/54
429/158
2015/0037689 A1 2/2015 Nishimura et al.
2020/0212450 A1 7/2020 Shimizu et al.

FOREIGN PATENT DOCUMENTS

JP 5228482 B2 7/2013
JP 2014187030 A 10/2014
(Continued)

OTHER PUBLICATIONS

Google English Machine Translation of JP 2016184483 originally published to Kawaji Jun on Oct. 20, 216 (Year: 2016).*

*Primary Examiner* — Cynthia H Kelly
*Assistant Examiner* — Niara Trant
(74) *Attorney, Agent, or Firm* — CKC & Partners Co., LLC

(57) ABSTRACT

To provide a solid-state battery in which the capacity and voltage can be optionally adjusted in a single battery and the installation space for the battery can be reduced.
A solid-state battery includes a plurality of electrode layers, and a solid electrolyte layer disposed between the electrode layers. The electrode layers includes positive electrode portion formed by filling a current collector including a metal porous body with a positive electrode material mixture, negative electrode portion formed by filling a current collector including a metal porous body with a negative electrode material mixture, and an isolation portion formed between the positive electrode portion and the negative electrode portion. Between the plurality of electrode layers disposed adjacent to each other, the positive electrode portion and the negative electrode portion are disposed so as to face each other, and the isolation portions are disposed so as to face each other.

8 Claims, 3 Drawing Sheets

(51) Int. Cl.
*H01M 4/76* (2006.01)
*H01M 4/62* (2006.01)
*H01M 4/66* (2006.01)

(56) References Cited

FOREIGN PATENT DOCUMENTS

JP 6016136 B2 10/2016
JP 2016184483 A 10/2016

* cited by examiner

SOLID-STATE BATTERY

This application is based on and claims the benefit of priority from Japanese Patent Application No. 2020-203392, filed on 8 Dec. 2020, the content of which is incorporated herein by reference.

BACKGROUND OF THE INVENTION

Field of the Invention

The present invention relates to a solid-state battery.

Related Art

Conventionally, lithium ion secondary batteries are widely used as secondary batteries having a high energy density. A lithium ion secondary battery is configured to include a positive electrode, a negative electrode, and a separator interposed therebetween, and to be filled with a liquid electrolyte.

Since the electrolytic solution of such a lithium ion secondary battery is usually a flammable organic solvent, some lithium ion secondary batteries pose a safety issue of heat, in particular.
Therefore, solid-state batteries employing an inorganic solid electrolyte as an alternative to the organic liquid electrolyte have been proposed.
For example, a technology relating to a solid-state secondary battery with high output and large capacity and a manufacturing method thereof has been proposed (see Patent Document 1).
Meanwhile, to increase the filling density of an electrode active material, it has been proposed to use a metal porous body instead of a conventionally widely used metal foil as current collectors constituting a positive electrode layer and a negative electrode layer.
The metal porous body has a network structure with pores and a large surface area.
By filling the interior of the network structure with an electrode material mixture including an electrode active material, the amount of the electrode active material per unit area of the electrode layer can be increased.
Patent Document 1: Japanese Unexamined Patent Application, Publication No. 2014-187030

SUMMARY OF THE INVENTION

A conventional solid-state battery using a metal foil as a current, collector is structured by connecting current collectors in parallel or by stacking electrodes to connect in series. Accordingly, necessary capacity and voltage have to be secured by combining a plurality of batteries having the above structure to some extent.
However, in applications where the installation space for batteries is limited, such as in automotive applications, the above method of combining a plurality of batteries may not be able to secure the installation space for batteries to ensure optimal capacity and voltage.
In response to the above issue, it is an object of the present invention to provide a solid-state battery in which the capacity and voltage can be optionally adjusted in a single battery and the installation space for the battery can be reduced.

(1) A first aspect of the present invention relates to a solid-state battery, including a plurality of electrode layers, and a solid electrolyte layer disposed between the electrode layers. Each of the electrode layers includes at least one positive electrode portion formed by filling a current collector including a metal porous body with a positive electrode material mixture, at least one negative electrode portion formed by filling a current collector including a metal porous body with a negative electrode material mixture, and an isolation portion formed between the positive electrode portion and the negative electrode portion. Between the plurality of electrode layers disposed adjacent to each other, the positive electrode portion and the negative electrode portion are disposed so as to face each other, and the isolation portions are disposed so as to face each other.

According to the invention of the first aspect, it is possible to provide a solid-state battery in which the capacity and voltage can be optionally adjusted in a single battery and the installation space for the battery can be reduced.

(2) In a second aspect of the present invention according to the first aspect, the electrode layers include a first electrode layer having the isolation portion formed by filling a metal porous body with a non-ionic-conductor.

According to the invention of the second aspect, batteries can be connected in series inside a solid-state battery.

(3) In a third aspect of the present invention according to the first or second aspect, the electrode layers include a second electrode layer having the isolation portion formed by disposing an insulating material.

According to the invention of the third aspect, batteries can be connected in parallel inside a solid-state battery.

(4) In a fourth aspect of the present invention according to the first aspect, the electrode layers include at least any one of a first electrode layer having the isolation portion formed by filling a metal porous body with a non-ionic-conductor and a second electrode layer having the isolation portion formed by disposing an insulating material. At least any one of the non-ionic-conductor and the insulating material includes a strength reinforcing material.

According to the invention of the fourth aspect, the strength of a solid-state battery can be improved.

(5) In a fifth aspect of the present invention according to any one of the first aspect to the fourth aspect, each of the electrode layers includes two or more of at least any one of the positive electrode portions and the negative electrode portions.

According to the invention of the fifth aspect, batteries can be connected in series in an electrode layer.

DETAILED DESCRIPTION OF THE INVENTION

Embodiments of the present invention will now be described with reference to the drawings.
In this regard, however, the following embodiments exemplify the present invention, and the present invention is not limited to the following embodiments.

First Embodiment

<Overall Structure of Solid-State Battery>

Figure 1:
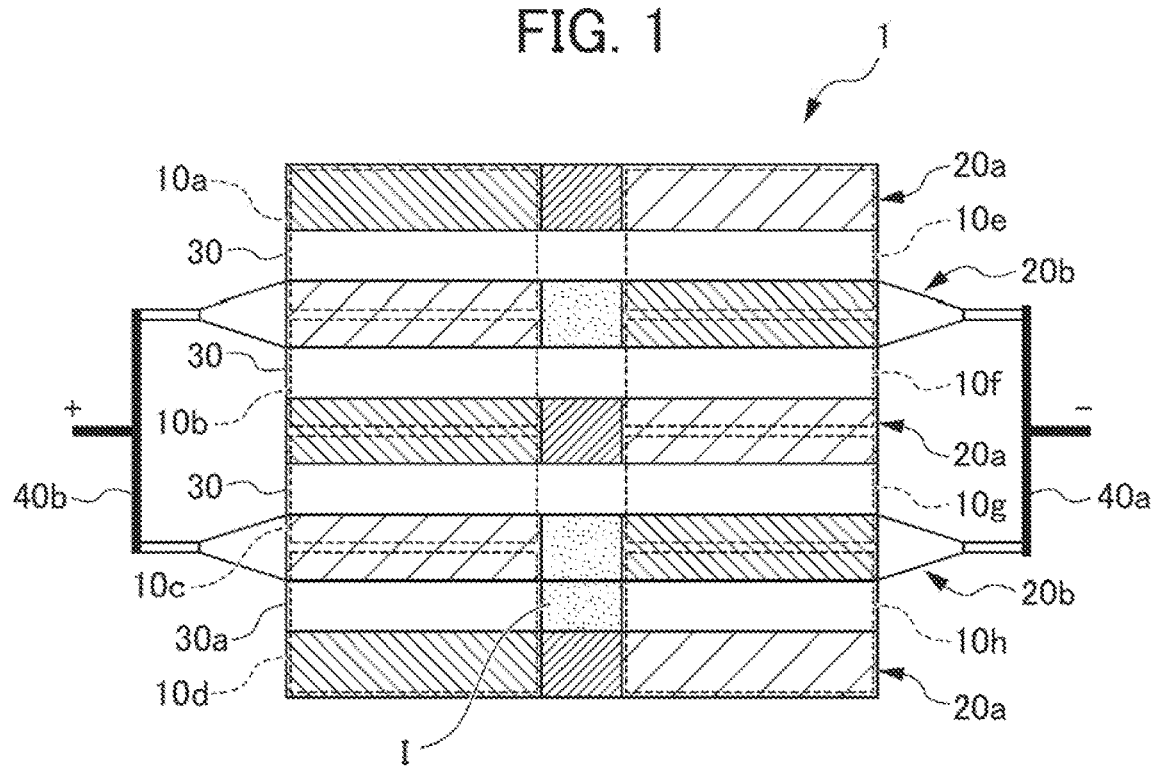
FIG. 1 is a cross-sectional schematic diagram of a solid-state battery according to a first embodiment of the present invention.

As shown in FIG. 1, in a solid-state battery 1 of this embodiment, a first electrode layer 20a, a solid electrolyte layer 30, a second electrode layer 20b, and a solid electrolyte layer 30 are stacked and disposed in this sequence. The solid-state battery 1 of this embodiment includes nine layers composed of three first electrode layers 20a, two second electrode layers 20b, and four solid electrolyte layers 30 or 30a stacked between the electrode layers.

The solid-state battery 1 has eight battery units 10a, 10b, 10c, 10d, 10e, 10f, 10g, and 10h. These battery units are connected in two series and four parallel, as described below. The second electrode layers 20b are each connected to a lead tab 40a and a lead tab 40b. In this embodiment, the solid-state battery 1 is a solid-state lithium ion secondary battery capable of charging and discharging by occluding and releasing lithium ions and electrons.

In the solid-state battery 1, the first electrode layer 20a and the second electrode layer 20b each have a positive electrode portion 50, a negative electrode portion 60, and an isolation portion Ia or I. The first electrode layer 20a and the second electrode layer 20b are alternately stacked via the solid electrolyte layer 30 or 30a disposed therebetween. Between the adjacent first electrode layer 20a and second electrode layer 20b, the positive electrode portion 50 and the negative electrode portion 60 are disposed so as to face each other with the solid electrolyte layer interposed therebetween, and the isolation portion I and the isolation portion Ia are disposed so as to face each other with the solid electrolyte layer interposed therebetween.

(First Electrode layer)

Figure 2:
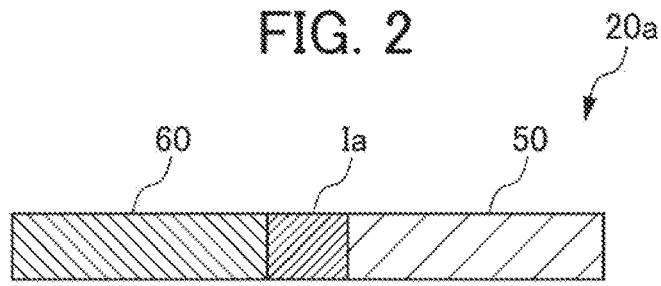
FIG. 2 is a cross-sectional schematic diagram of a first electrode layer according to the first embodiment of the present invention.

As shown in FIG. 2, the first electrode layer 20a includes the negative electrode portion 60, the isolation portion Ia, and the positive electrode portion 50, in this sequence. The positive electrode portion 50 and the negative electrode portion 60 are each formed by filling a current collector including a metal porous body having pores (communication pores) that are continuous with each other, with a positive electrode material mixture or a negative electrode material mixture including an electrode active material. The isolation portion Ia has electric conductivity and no ionic conductivity.

The isolation portion Ia is formed, for example, by filling a metal porous body with a non-ionic-conductive material. The metal porous body constituting the positive electrode portion 50, the negative electrode portion 60, and the isolation portion Ia may be, for example, an electrically connected integrated metal porous body. The above structure enables electrons to be transferred between the positive electrode portion 50 and the negative electrode portion 60 and prevents ions such as lithium ions from being transferred therebetween.

It is preferable that the non-ionic-conductive material with which the isolation portion Ia is filled, has no ionic conductivity and is a strength reinforcing material. Examples of the strength reinforcing material include a synthetic resin. The synthetic resin is not limited. Examples thereof include thermosetting resins such as a polyimide resin, an epoxy resin, a silicone resin, and a polyurethane resin; thermoplastic resins such as a polyolefin resin, a polystyrene resin, a fluorine resin, a polyvinyl chloride resin, a polymethacrylic acid resin, and a polyurethane resin; and photocurable resins such as a silicone resin, a polymethacrylic acid resin, and a polyester resin. The non-ionic-conductive material with which the isolation portion Ia is filled, may be an insulating material or it may be electrically conductive.

(Second Electrode Layer)

Figure 3:
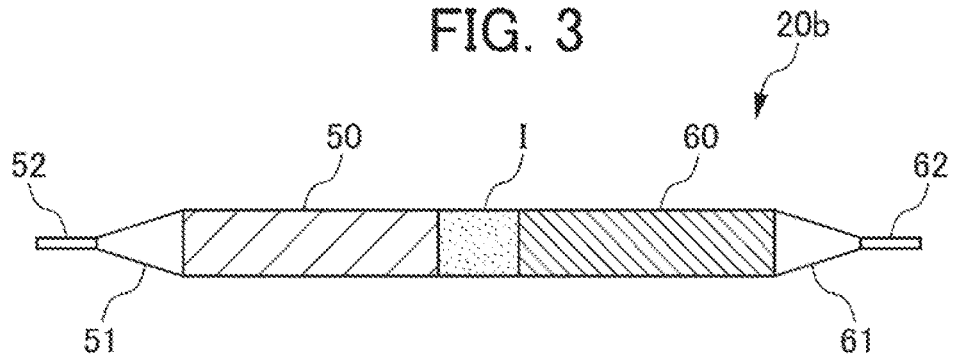
FIG. 3 is a cross-sectional schematic diagram of a second electrode layer according to the first embodiment of the present invention.

As shown in FIG. 3, the second electrode layer 20b includes the positive electrode portion 50, the isolation portion I, and the negative electrode portion 60, in this sequence. The positive electrode portion 50 and the negative electrode portion 60 have the same structure as in the first electrode layer. The isolation portion I is the part that does not have electric and ionic conductivity. The isolation portion I is formed by disposing an insulating material. In the second electrode layer 20b, the metal porous body constituting the positive electrode portion 50 and the metal porous body constituting the negative electrode portion 60 are separated from each other by the isolation portion I, and are not electrically connected to each other. The above structure prevents transfer of electrons and ions such as lithium ions between the positive electrode portion 50 and the negative electrode portion 60.

Examples of the insulating material disposed in the isolation portion I include the synthetic resins exemplified as the substance disposed in the isolation portion Ia. However, materials with electric conductivity or ionic conductivity cannot be used.

Tab convergence portions 51 and 61, which are reduced in diameter, and tab portions 52 and 62, are formed at both ends of the second electrode layer 20b. The tab convergence portions 51 and 61 and the tab portions 52 and 62 are regions that are not filled with an electrode material mixture. The tabs 52 and 62 are electrically connected to lead tabs 40b and 40a, respectively, by welding or the like.

(Current Collector)

The current collector constituting the positive electrode portion 50 and the current collector constituting the negative electrode portion 60 each include a metal porous body. Since the metal porous body has pores that are continuous with each other, the internal portions of the pores can be filled with a positive electrode material mixture or a negative electrode material mixture including an electrode active material. Thus, the amount of the electrode active material per unit area of the electrode layer can be increased. The form of the metal porous body is not limited as long as it has pores that are continuous with each other. Examples of the form of the metal porous body include a foam metal having pores by foaming, a metal mesh, an expanded metal, a punching metal, and a metal nonwoven fabric.

The metal used in the metal porous body is not limited as long as it has electric conductivity. Examples thereof include nickel, aluminum, stainless steel, titanium, copper, and silver. Among these, as the current collector constituting the positive electrode, a foamed aluminum, foamed nickel, and foamed stainless steel are preferable. As the current collector constituting the negative electrode, a foamed copper and foamed stainless steel are preferable. The use of the metal porous body as the current collector allows the amount of the active material per unit area of the electrode to be increased, and as a result, the volumetric energy density of the solid-state battery can be improved. In addition, since the positive electrode material mixture and the negative electrode material mixture is easily fixed, it is not necessary to thicken a coating slurry for forming the electrode material mixture layer when a film of the electrode material mixture layer is thickened, unlike a conventional electrode using a metal foil as a current collector. Therefore, it is possible to reduce a binder such as an organic polymer compound that has been necessary for thickening. Accordingly, the capacity per unit area of the electrode can be increased, and a higher capacity of the solid-state battery can be achieved.

(Electrode Material Mixture)

The positive electrode material mixture constituting the positive electrode portion 50 and the negative electrode material mixture constituting the negative electrode portion 60 are each disposed in pores formed in the metal porous body as a corresponding current collector. The positive electrode material mixture and the negative electrode material mixture respectively include a positive electrode active material and a negative electrode active material as an essential component.

(Electrode Active Material)

The positive electrode active material is not limited as long as it can occlude and release lithium ions. Examples thereof include $LiCoO_2$, $Li(Ni_{5/10}Co_{2/10}Mn_{3/10})O_2$, $Li(Ni_{6/10}Co_{2/10}Mn_{2/10})O_2$, $Li(Ni_{8/10}Co_{1/10}Mn_{1/10})O_2$, $Li(Ni_{0.8}Co_{0.15}Al_{0.05})O_2$, $Li(Ni_{1/6}Co_{4/6}Mn_{1/6})O_2$, $Li(Ni_{1/3}Co_{1/3}Mn_{1/3})O_2$, $Li(Ni_{1/3}Co_{1/3}Mn_{1/3})O_2$, $LiCoO_4$, $LiMn_2O_4$, $LiNiO_2$, $LiFePO_4$, lithium sulfide, and sulfur.

The negative electrode active material is not limited as long as it can occlude and release lithium ions. Examples thereof include metallic lithium, lithium alloys, metal oxides, metal sulfides, metal nitrides, Si, SiO, and carbon materials such as artificial graphite, natural graphite, hard carbon, and soft carbon.

(Other Components)

The electrode material mixture may optionally include components other than an electrode active material and ionic conductive particles. The other components are not limited, and can be any components that can be used in making a lithium-ion secondary battery. Examples thereof include a conductivity aid, and a binder. Acetylene black is an example of the conductivity aid of the positive electrode, and polyvinylidene fluoride is an example of the binder of the positive electrode. Examples of the binder of the negative electrode include sodium carboxyl methyl cellulose, styrene-butadiene rubber, and sodium polyacrylate.

(Solid Electrolyte Layer)

In the present embodiment, the solid electrolyte layers 30 and 30a, which are each stacked in the form of a layer between the first electrode layer 20a and the second electrode layer 20b, each include at least a solid electrolyte material, which is a solid or gel electrolyte. Charge transfer between the positive electrode active material and the negative electrode active material can be performed via the solid electrolyte material.

The solid electrolyte material is not limited. Examples thereof include a sulfide solid electrolyte material, an oxide solid electrolyte material, a nitride solid electrolyte material, and a halide solid electrolyte material.

The solid electrolyte layer in this embodiment may have the isolation portion I formed by disposing an insulating material, as in the solid electrolyte layer 30a. With respect to the structure of the isolation portion I, the same structure as the isolation portion I in the second electrode layer 20b can be applied. This can prevent ions from migrating to a different cell when in the solid electrolyte layer. For example, in the battery unit 10d shown in FIG. 1, it is possible to prevent ions from transferring to the adjacent battery unit 10h during charging and discharging. In FIG. 1, only one solid electrolyte layer 30a having the isolation portion I is disposed, but all solid electrolyte layers may have the isolation portion I.

<Connection State of Each Battery Unit in Solid-State Battery 1>

The connection state of each battery unit of the solid-state battery 1 is described below with reference to FIG. 1. The battery units 10a and 10e are connected in series by electrically connecting the positive electrode portion 50 to the negative electrode portion 60 by the isolation portion Ia of the first electrode layer 20a. Similarly, the battery units 10b and 10f, the battery units 10c and 10g, and the battery units 10d and 10h are also connected in series by the isolation portion Ia of the first electrode layer 20a.

The battery units 10a and 10b are connected in parallel by using the positive electrode portion 50 of the second electrode layer 20b as a common electrode. Similarly, the battery units 10e and 10f are connected in parallel by using the negative electrode portion 60 of the second electrode layer 20b as a common electrode. Accordingly, the battery units 10a and 10e, which are connected in series, are respectively connected in parallel to the battery units 10b and 10f. Similarly, the battery units 10c and 10g, which are connected in series, are respectively connected in parallel to the battery units 10d and 10h. The battery units 10a and 10b are connected in parallel to the battery units 10c and 10d by the lead tab 40b. Similarly, the battery units 10e and 10f are connected in parallel to the battery units 10g and 10h by the lead tab 40a. Therefore, the solid-state battery 1 has a structure of two series and four parallel. In this way, the combination of the first electrode layers 20a and the second electrode layers 20b enables a solid-state battery having any capacity to be constructed.

<Methods for Manufacturing First and Second Electrode Layers>

Methods for manufacturing the first electrode layer 20a and the second electrode layer 20b each include a material mixture filling step, in which the positive electrode portion 50 and the negative electrode portion 60 are each formed by filling pores of a metal porous body as a corresponding current collector with an electrode material mixture. The method of filling the current collector with the electrode material mixture is not limited. Examples thereof include the method of filling the internal portions of the pores of the current collector with a slurry including the electrode material mixture by applying pressure using a plunger-type die coater, and the method of impregnating the pores of the metal porous body with the electrode material mixture by a dipping method.

The method for manufacturing the first electrode layer 20a includes a non-ionic-conductive material filling step, in which the isolation portion Ia is formed by filling the interior of a metal porous body with a non-ionic-conductive material. With respect to the method of filling the metal porous body with the non-ionic-conductive material, the same method as in the material mixture filling step described above can be applied. The method for manufacturing the second electrode layer 20b includes an insulating material disposition step, in which the isolation portion I is formed by disposing an insulating material between the positive electrode portion 50 and the negative electrode portion 60.

The methods for manufacturing the first electrode layer 20a and the second electrode layer 20b each include a pressing step, in which the corresponding current collector, which is partially impregnated with the electrode material mixture, is pressed by a method such as roll pressing. The pressing process forms the tab convergence portions 51 and 61 and the tab portions 52 and 62 of the second electrode layer 20b.

Another embodiment of the present invention is described below. Description of the same structure as that of the first embodiment may be omitted.

Second Embodiment

<Overall Structure of Solid-State Battery>

Figure 4:
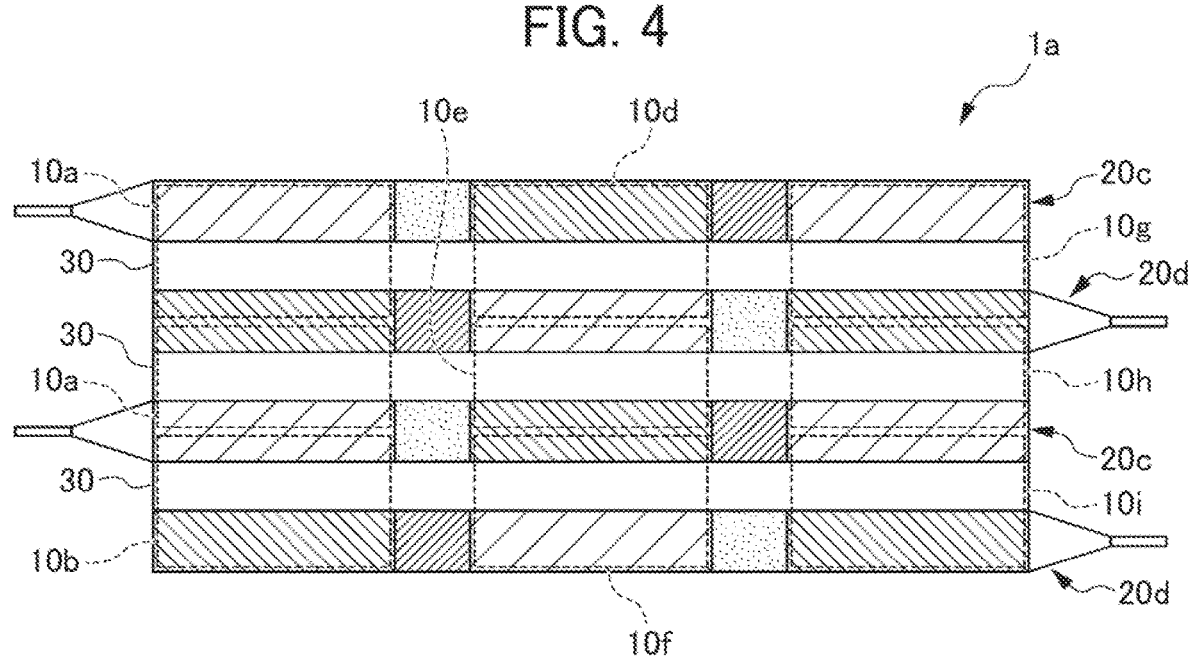
FIG. 4 is a cross-sectional schematic diagram of a solid-state battery according to a second embodiment of the present invention.

As shown in FIG. 4, in a solid-state battery 1a of this embodiment, a third electrode layer 20c, a solid electrolyte layer 30, a fourth electrode layer 20d, and a solid electrolyte layer 30 are stacked and disposed in this sequence. The solid-state battery 1a of this embodiment includes seven layers composed of two third electrode layers 20c, two fourth electrode layers 20d, and three solid electrolyte layers 30.

The solid-state battery 1a has nine battery units 10a, 10b, 10c, 10d, 10e, 10f, 10g, 10h, and 10i. These battery units are connected in three series and three parallel, as described below.

In the solid-state battery 1a, the third electrode layer 20c has two positive electrode portions 50, a negative electrode portion 60, an isolation portion I, and an isolation portion Ia. The fourth electrode layer 20d has two negative electrode portions 60, a positive electrode portion 50, an isolation portion I, and an isolation portion Ia.

The third electrode layer 20c and the fourth electrode layer 20d are alternately stacked via the solid electrolyte layer 30 disposed therebetween. Between the adjacent third electrode layer 20c and fourth electrode layer 20d, the positive electrode portion 50 and the negative electrode portion 60 are disposed so as to face each other with the solid electrolyte layer 30 interposed therebetween, and the isolation portion I and the isolation portion Ia are disposed so as to face each other with the solid electrolyte layer 30 interposed therebetween. The solid electrolyte layer 30 may have an isolation portion I in between, similarly to the solid electrolyte layer 30a in the solid-state battery 1.

(Third Electrode Layer)

Figure 5:
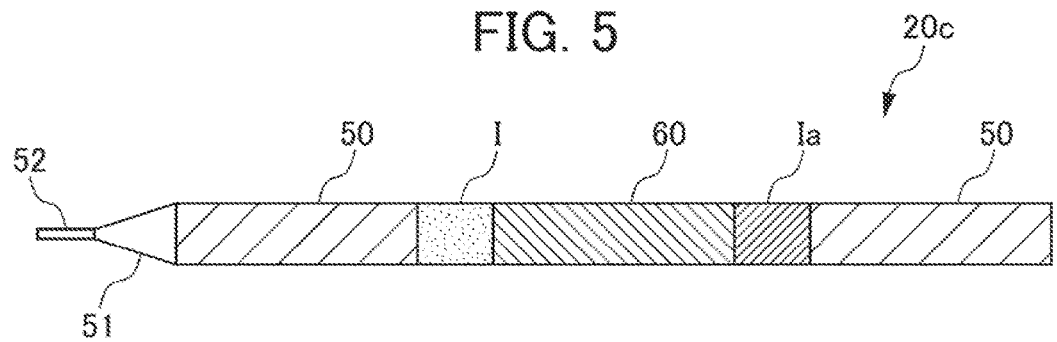
FIG. 5 is a cross-sectional schematic diagram of an electrode layer according to the second embodiment of the present invention.

As shown in FIG. 5, the third electrode layer 20c includes the positive electrode portion 50, the isolation portion I, the negative electrode portion 60, the isolation portion Ia, and the positive electrode portion 50, in this sequence. At one end of the third electrode layer 20c, a tab convergence portion 51 that is reduced in diameter and a tab portion 52 are formed. The tab portion 52 is electrically connected to a lead tab (not shown) by welding or the like.

Figure 6:
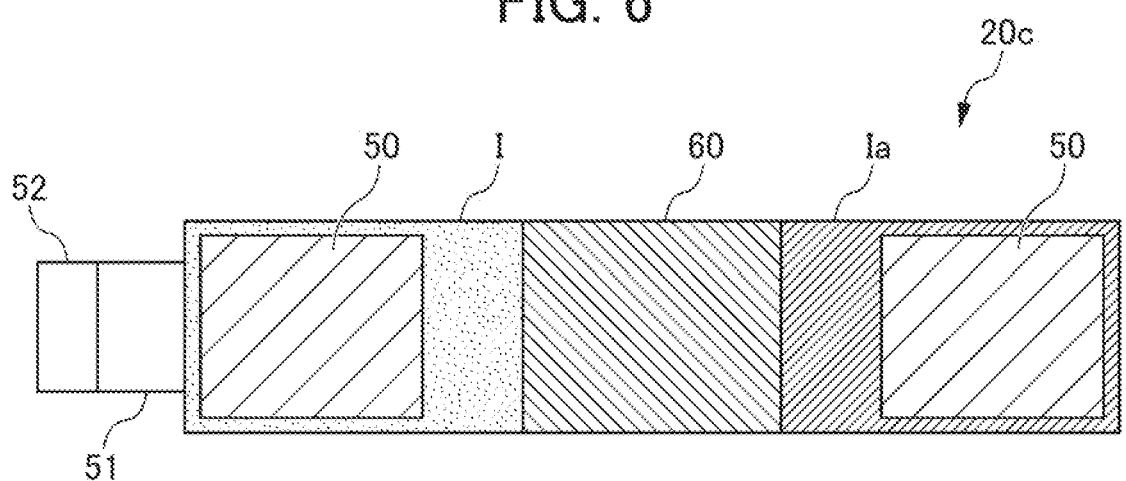
FIG. 6 is a top schematic diagram of the electrode layer according to the second embodiment of the present invention.

As shown in FIG. 6, the third electrode layer 20c may be configured such that the area of the positive electrode portion 50 is smaller than the area of the opposing negative electrode portion 60 by disposing an isolation portion I or Ia around the face facing the negative electrode portion 60 of the positive electrode portion 50. As a result, lithium precipitation due to the concentration of electric current at the ends of the negative electrode portion 60 can be suppressed.

(Fourth Electrode Layer)

Figure 7:
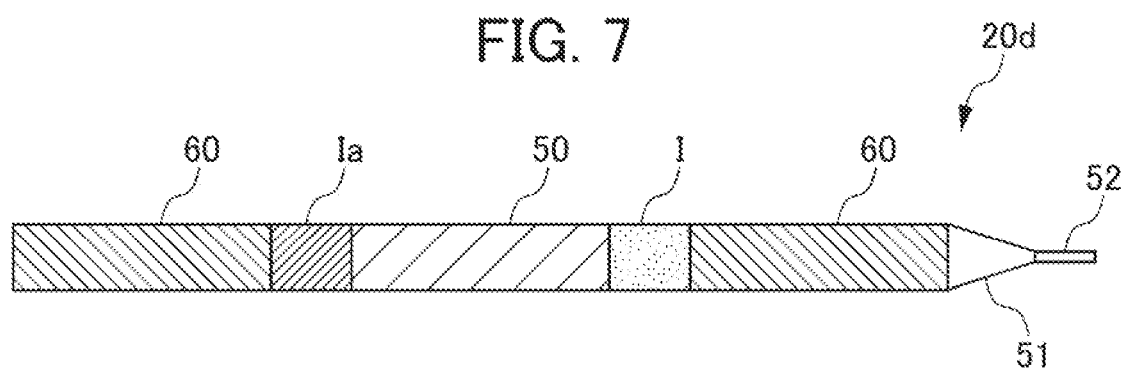
FIG. 7 is a cross-sectional schematic diagram of an electrode layer according to the second embodiment of the present invention.

As shown in FIG. 7, the fourth electrode layer 20d includes the negative electrode portion 60, the isolation portion Ia, the positive electrode portion 50, the isolation portion I, and the negative electrode portion 60, in this sequence. At one end of the fourth electrode layer 20d, the tab convergence portion 51 that is reduced in diameter and the tab portion 52 are formed. The tab portion 52 is electrically connected to a lead tab (not shown) by welding or the like.

<Connection State of Each Battery Unit in Solid-State Battery 1a>

The connection state of each battery unit of the solid-state battery 1a is described below with reference to FIG. 4. The battery units 10a and 10d are connected in series by electrically connecting the positive electrode portion 50 to the negative electrode portion 60 by the isolation portion Ia of the third electrode layer 20c. The battery units 10d and 10g are similarly connected in series by the isolation portion Ia of the fourth electrode layer 20d. That is, the battery units 10a, 10d, and 10g are connected in series. Similarly, the battery units 10b, 10e, and 10h are connected in series, and the battery units 10c, 10f, and 10i are connected in series.

The battery units 10a and 10b are connected in parallel by using the negative electrode portion 60 of the fourth electrode layer 20d as a common electrode. Similarly, the battery units 10g and 10h are connected in parallel. Accordingly, the battery units 10a, 10d, and 10g, which are connected in series, are respectively connected in parallel to the battery units 10b, 10e, and 10h. Similarly, the battery units 10c, 10f, and 10i, which are connected in series, are also connected in parallel. Therefore, the solid-state battery 1a has a structure of three series and three parallel. Thus, the battery units can be connected in series by providing the positive electrode portion 50 and the negative electrode portion 60 with the isolation portion Ia interposed therebetween in one electrode layer. Similarly, the battery units can be connected in parallel by providing the positive electrode portion 50 and the negative electrode portion 60 with the isolation portion I interposed therebetween in one electrode layer.

Preferred embodiments of the present invention have been described above. The present invention is not limited to the above embodiments and can be modified as appropriate.

The third electrode layer 20c in the second embodiment was described as one that may be configured so that the area of the positive electrode portion 50 is smaller than the area of the opposing negative electrode portion 60. With respect to the other electrode layer, as in the third electrode layer, the area of the positive electrode portion 50 may be configured to be smaller than the area of the opposing negative electrode portion 60.

EXPLANATION OF REFERENCE NUMERALS 1, 1a solid-state battery
20a first electrode layer
20b second electrode layer
30 solid electrolyte layer
50 positive electrode portion
60 negative electrode portion
I, Ia isolation portion

What is claimed is:
1. A solid-state battery, comprising:
a plurality of electrode layers; and
a solid electrolyte layer disposed between the electrode layers,
the electrode layers comprising a first electrode layer and a second electrode layer,
the first electrode layer comprising:
a positive electrode portion formed by filling a current collector comprising a metal porous body with a positive electrode material mixture;

a negative electrode portion formed by filling a current collector comprising a metal porous body with a negative electrode material mixture; and an electroconductive isolation portion formed between the positive electrode portion and the negative electrode portion, the electroconductive isolation portion having electric conductivity and no ionic conductivity, the second electrode layer comprising:

a positive electrode portion formed by filling a current collector comprising a metal porous body with a positive electrode material mixture;

a negative electrode portion formed by filling a current collector comprising a metal porous body with a negative electrode material mixture, and an insulating isolation portion formed between the positive electrode portion and the negative electrode portion, the insulating isolation portion having no electric conductivity and no ionic conductivity, the first electrode layer and the second electrode layer being disposed such that the positive electrode portion and the negative electrode portion face each other.

2. The solid-state battery according to claim 1, wherein the electroconductive isolation portion is formed by filling a metal porous body with a non-ionic-conductor.

3. The solid-state battery according to claim 1, wherein the insulating isolation portion is formed by disposing an insulating material.

4. The solid-state battery according to claim 1, wherein the electroconductive isolation portion is formed by filling a metal porous body with a non-ionic-conductor, and the insulating isolation portion is formed by disposing an insulating material, and at least any one of the non-ionic-conductor and the insulating material comprises a strength reinforcing material.

5. A solid-state battery, comprising:

a plurality of electrode layers; and a solid electrolyte layer disposed between the electrode layers;

each of the electrode layers comprising:

at least one positive electrode portion formed by filling a current collector comprising a metal porous body with a positive electrode material mixture;

at least one negative electrode portion formed by filling a current collector comprising a metal porous body with a negative electrode material mixture; and an isolation portion formed between the positive electrode portion and the negative electrode portion, at least one of the positive electrode portion or the negative electrode portion comprising two or more positive or negative electrode portions, and the positive electrode portion and the negative electrode portion being alternately disposed, the isolation portion comprising an electroconductive isolation portion having electric conductivity and no ionic conductivity and an insulating isolation portion having no electric conductivity and no ionic conductivity, and the electroconductive isolation portion and the insulating isolation portion being alternately disposed, and the plurality of electrode layers being disposed such that the positive electrode portion and the negative electrode portion face each other, and the electroconductive isolation portion and the insulating isolation portion face each other.

6. The solid-state battery according to claim 5, wherein the electroconductive isolation portion is formed by filling a metal porous body with a non-ionic-conductor.

7. The solid-state battery according to claim 5, wherein the insulating isolation portion is formed by disposing an insulating material.

8. The solid-state battery according to claim 5, wherein the electroconductive isolation portion is formed by filling a metal porous body with a non-ionic-conductor, and the insulating isolation portion is formed by disposing an insulating material, and at least any one of the non-ionic-conductor and the insulating material comprises a strength reinforcing material.

* * * * *